Feb. 17, 1931.     H. S. EBERHARD     1,792,682
TRACTOR DRIVE
Filed May 26, 1930
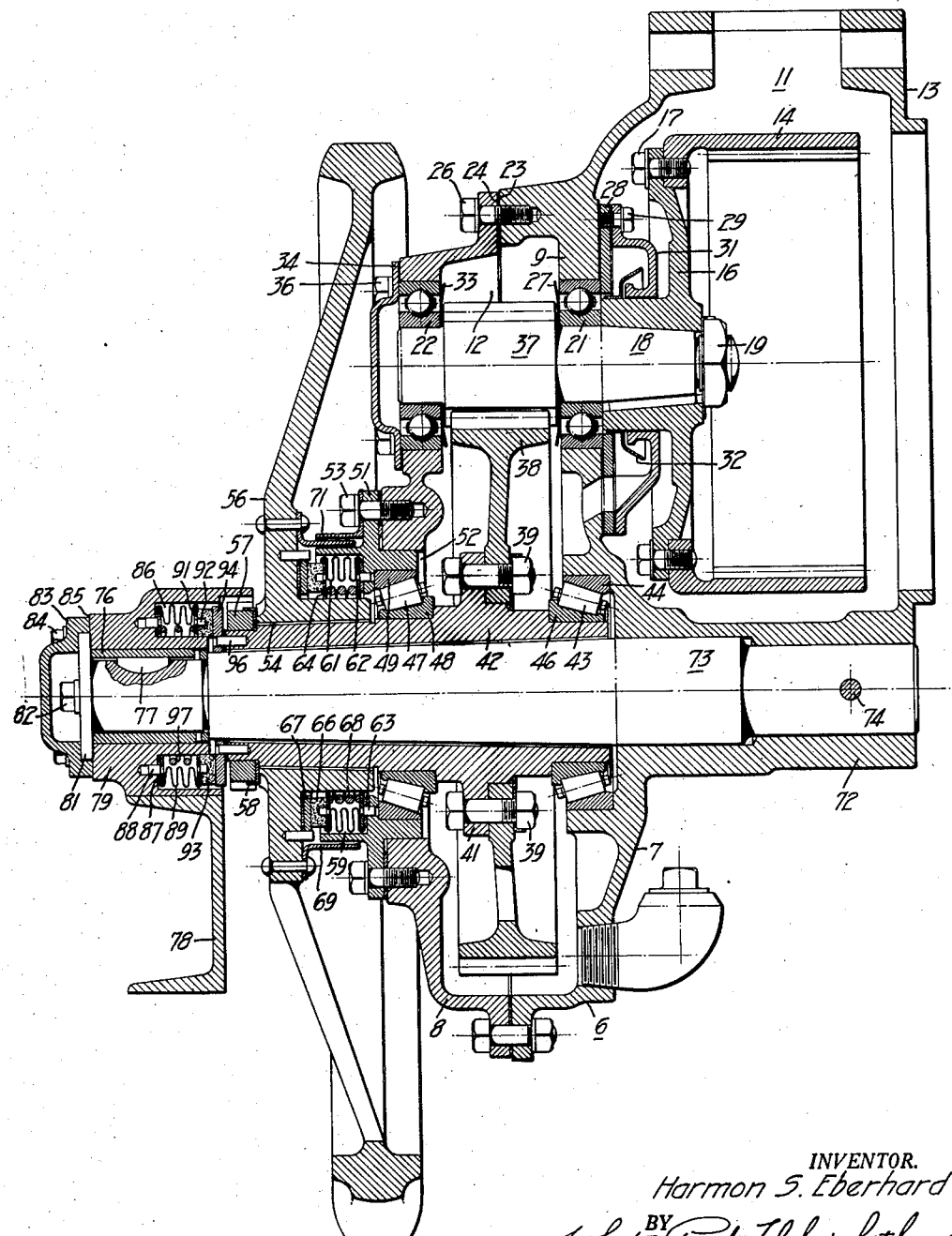
INVENTOR.
Harmon S. Eberhard
BY
White, Prost, Flehr & Lothrop
ATTORNEYS.

Patented Feb. 17, 1931

1,792,682

UNITED STATES PATENT OFFICE

HARMON S. EBERHARD, OF SAN LEANDRO, CALIFORNIA, ASSIGNOR TO CATERPILLAR TRACTOR CO., OF SAN LEANDRO, CALIFORNIA, A CORPORATION OF CALIFORNIA

TRACTOR DRIVE

Application filed May 26, 1930. Serial No. 455,628.

My invention is particularly concerned with tractors of the track laying type and is particularly directed to the final drive mechanism of such vehicles.

In one type of track laying tractor the construction includes a tractor body which is supported on a pair of trucks arranged one at each side of the body. The trucks include truck frames which are preferably journalled concentrically or co-axially with the axis of rotation of drive sprockets driven from the source of power of the tractor. In the past considerable difficulty has been encountered in constructing the mechanism associated with the mounting of the truck frame and the sprocket on the tractor body since it is necessary not only to mount the truck frame pivotally but also to transmit motion to the driving sprocket. Suitable bearings must be included and these have heretofore necessarily been of relatively great size and cost. Furthermore it is practically essential in a modern tractor to provide adequate shields or dust protectors for all of the exposed joints and this problem has been a particularly difficult one in truck mountings and drives of the type mentioned.

It is therefore an object of my invention to provide a tractor drive which is considerably simplified over previous practice.

Another object of my invention is to provide a tractor drive in which the bearings are of relatively small size.

Another object of my invention is to provide a tractor drive in which shields for the exclusion of dust and dirt are easily and advantageously placed.

Another object of my invention is to facilitate the initial assembly and subsequent assembly and disassembly of the final drive mechanism.

The foregoing and other objects are attained in the embodiment of the invention as shown in the accompanying drawings, in which The figure is a cross section, on a plane transversely of the tractor, through the axis of a tractor drive in accordance with my invention.

In its preferred form, the tractor drive of my invention includes a housing from which a truck supporting shaft projects, together with means encompassing the truck supporting shaft and journalled in the housing for transmitting motion from the interior of the housing to the exterior thereof.

In the form of my invention which I have chosen to disclose in the accompanying drawing there is provided a housing generally designated 6 including a base 7 and a cap 8. The base 7 is preferably a unitary casting and includes a wall 9 separating the housing into a chamber 11 and a chamber 12. The base 7 is secured with the chamber 11 in communication with the interior of the tractor body by a plurality of fastening means, not shown, which hold a planar face 13 of the base 7 in abutment with a corresponding face of the tractor body.

Within the chamber 11 is disposed mechanism for receiving motion from the source of power on the tractor in this case including the driven member 14 of a clutch. The member 14 is mounted on a spider 16 by studs 17 and is coaxial with a shaft 18 to which the spider 16 is held by a nut 19. The shaft 18 is located by bearings 21 and 22 respectively secured in the base 7 and in the cap 8. To ensure the proper relationship of the base and the cap they are provided with abutting faces 23 and 24 which are held in relationship by a series of studs 26. The bearing 21 on one side is provided with an oil guard 27 and on the opposite side, within the chamber 11, is located by a disc 28 held in place by studs 29 which also retain an oil shield 31 co-operating with an oil sling 32 mounted on the hub of spider 16. The bearing 22 is likewise provided on one side with an oil shield 33 and on the other side is held in place by a plate 34 mounted on the cap 8 by studs 36.

Located within the chamber 12 is a pinion 37 preferably formed integrally with the shaft 18. The pinion 37 rotates within the housing 6 in unison with rotation of the driven member 14 and also drives in synchronism therewith a drive gear 38 situated within the chamber 12 and mounted by a series of studs 39 on a flange 41 forming part of a quill 42.

In order to support the quill 42 for rotation with respect to the housing 6 and in synchronism with the drive gear 38, I provide it at one end with an anti-friction bearing 43 one cage 44 of which is mounted within the base 7 and the inner cage 46 of which is directly mounted on the quill 42. Correspondingly, on the opposite side of flange 41 I provide an anti-friction bearing 47 the inner race 48 of which is mounted on the quill 42 and the outer race 49 of which is retained within a cage 51 held within an aperture 52 of the cap 8 by a series of studs 53.

In order to take advantage of the rotation of the quill 42 in conjunction with the rotation of the drive gear 38 I extend the quill 42 beyond the bearing 47 through the aperture 52 in the housing 6 and provide it with splines 54 on which a sprocket 56 is mounted. The sprocket is of the conventional sort for engagement with a track, not shown, and is held in place on the splines 54 by a nut 57 restrained from accidental rotation by a lock washer 58. Since the quill 42 projects from within the housing 6 adjacent the sprocket 56 and since there is relative rotation between the sprocket 56 and the housing 6 inasmuch as the sprocket 56, the quill 42 and the drive gear 38 are functionally integral, I preferably provide a seal generally designated 59 between the housing 6 and the sprocket 56. The seal usually includes a metallic bellows 61 secured to a plate 62 held by pins 63 in the cage 51. The bellows 61 is likewise connected to a plate 64 fastened to a ring 66 held in abutment with a disc 67 on the sprocket 56 by a coil spring 68 encompassed by the bellows 61 and abutting the plates 62 and 64. As an added protection to the seal, an annular flange 69 is fastened to the sprocket 56 to overlie a portion of the cage 51 and as a guard against falling objects a flange 71 is fastened by means of the studs 53 partially to overlie the annular flange 69.

In order to support a truck frame coaxially with the axis of rotation of the functionally integral sprocket, quill and drive gear I provide the base 7 of the housing 6 with a hollow boss 72 into which a stub shaft 73 is inserted. The shaft 73 is fixed in place by a pin 74 passing through the shaft and the boss 72. The stub shaft projects into the housing 6 and passes within the rotatable quill 42 with sufficient clearance to permit some flexure of the stub shaft 73 without contact between the shaft and the quill.

From within the quill the shaft 73 passes through the aperture 52 to extend beyond the sprocket 56 in order to carry a truck frame. The extremity of the stub shaft is reduced in diameter to receive a bushing 76 fixed on the shaft by a key 77. Mounted to pivot on the bushing 76 is a truck frame 78 including a journal 79.

In order to locate the journal 79 axially I preferably fasten a thrust washer 81 on the end of the stub shaft by means of a stud 82 passing into the end of the shaft. Overlying the washer 81 is a grooved cap 83 held by studs 84 in abutment with a face 85 on the journal 79. The cap 83 not only assists in locating the journal 79 axially with respect to the stub shaft 73 but forms a complete closure therefor.

In order to provide a closure between the relatively stationary journal 79 and the rotary sprocket 56 of the functionally integral sprocket, quill and drive gear unit I provide a seal 86. The seal is comparable to the seal 71 and includes a plate 87 held by pins 88 in relationship to the journal 79. Fast on the plate 87 is a metallic expansible bellows 89 also secured to a plate 91 held by pins 92 to an annular member 93. Abutting the member 93 is a ring 94 secured by pins 96 to the quill 42. To bias the ring 93 against the plate 94 I provide a coil spring 97 within the bellows 89.

The tractor drive constructed in accordance with my invention provides an improved means for transmitting power or motion from the source of power on the tractor to the sprocket in engagement with the track. Not only is the bearing mounting improved but the bearings required are considerably smaller than have heretofore been deemed necessary. In addition, the truck frame mounting is directly on a stub shaft which transmits the load to the housing of the unit and is capable of considerable flexure under load without imposing any load whatsoever upon the bearings supporting the quill and sprocket unit for rotation. Furthermore, the use and positioning of seals to prevent the ingress of dust and the egress of lubrication is greatly facilitated so that the entire assembly is substantially enclosed.

It is to be understood that I do not limit myself to the form of the tractor drive shown and described herein, as the invention, as set forth in the following claims may be embodied in a plurality of forms.

I claim:

1. A tractor drive comprising a housing, a stub shaft passing through and fixed at one end in said housing, a truck frame pivotally mounted on the other end of said stub shaft, a quill encompassing said shaft and journalled in said housing, and a sprocket mounted on said quill exteriorly of said housing.

2. A tractor drive comprising a housing, a stub shaft passing through and fixed in said housing, a truck frame mounted on said stub shaft exteriorly of said housing, a quill encompassing said stub shaft and journalled in said housing, and a sprocket mounted on said quill for rotation therewith.

3. A tractor drive comprising a housing, a stub shaft passing through and fixed in said housing, a truck frame mounted on said stub shaft exteriorly of said housing, a quill encompassing said shaft and journalled in said housing, a drive gear fixed on said quill interiorly of said housing, and a sprocket fixed on said quill exteriorly of said housing.

4. A tractor drive comprising a housing, a stub shaft passing through and fixed in said housing, a truck frame mounted on said stub shaft exteriorly of said housing, a quill encompassing said shaft and journalled in said housing, a drive gear fixed on said quill interiorly of said housing, a sprocket fixed on said quill exteriorly of said housing, a seal between said truck frame and said quill, and a seal between said sprocket and said housing.

5. A tractor drive comprising a housing; a stub shaft fixed in and passing through said housing; and a functionally integral unit including a quill, a drive gear interiorly of said housing, and a sprocket exteriorly of said housing, said unit encompassing said shaft and being journalled in said housing.

6. A tractor drive comprising a housing; a stub shaft fixed in and passing through said housing; a truck frame journalled on said stub shaft exteriorly of said housing; a functionally integral unit including a quill, a drive gear interiorly of said housing, and a sprocket exteriorly of said housing, said unit encompassing said shaft and being journalled in said housing; and seals between said truck frame and said unit and between said housing and said unit.

7. A tractor drive comprising a hollow housing including a cap having an aperture therein and a base, a stub shaft fixed in said base and passing through said aperture, a quill encompassing said stub shaft and passing through said aperture, a bearing between said quill and said base, a second bearing between said quill and said cap, a drive gear on said quill interiorly of said housing, a sprocket on said quill exteriorly of said housing, and a truck frame journalled on said stub shaft adjacent said sprocket.

8. A tractor drive comprising a housing, truck supporting means extending into said housing, and means encompassing said truck supporting means for transmitting motion from the interior of said housing to the exterior of said housing.

9. A tractor drive comprising a housing, truck supporting means extending into said housing, and means bearing on said housing and encompassing said truck supporting means for transmitting motion from the interior of said housing to the exterior of said housing.

In testimony whereof, I have hereunto set my hand.

HARMON S. EBERHARD.